(12) United States Patent
Kim et al.

(10) Patent No.: US 11,585,918 B2
(45) Date of Patent: Feb. 21, 2023

(54) GENERATIVE ADVERSARIAL NETWORK-BASED TARGET IDENTIFICATION

(71) Applicant: Raytheon Company, Waltham, MA (US)

(72) Inventors: Peter Kim, Irvine, CA (US); Matthew D. Hollenbeck, Hawthorne, CA (US); Michael J. Sand, Torrance, CA (US)

(73) Assignee: Raytheon Company, Waltham, MA (US)

( * ) Notice: Subject to any disclaimer, the term of this patent is extended or adjusted under 35 U.S.C. 154(b) by 413 days.

(21) Appl. No.: 16/742,415

(22) Filed: Jan. 14, 2020

(65) Prior Publication Data
US 2021/0215818 A1    Jul. 15, 2021

(51) Int. Cl.
*G01S 13/90*    (2006.01)

(52) U.S. Cl.
CPC ........ *G01S 13/9029* (2013.01); *G01S 13/904* (2019.05); *G01S 13/9011* (2013.01)

(58) Field of Classification Search
CPC ............. G01S 13/9029; G01S 13/9011; G01S 13/904; G06V 10/255; G06V 10/82; G06V 20/176; G06V 20/58; G06V 20/64; G06N 3/084; G06N 3/086; G06N 3/0454; G06N 3/0472; G06N 3/088; G06K 9/6271
USPC .......................................................... 342/25
See application file for complete search history.

(56) References Cited

U.S. PATENT DOCUMENTS

| 2011/0202538 A1* | 8/2011 | Salemann | G06F 16/29 |
| | | | 707/769 |
| 2017/0350974 A1* | 12/2017 | Korchev | G01S 7/412 |
| 2018/0025257 A1* | 1/2018 | van den Oord | G06K 9/623 |
| | | | 375/240.14 |

(Continued)

FOREIGN PATENT DOCUMENTS

WO    WO-2021145945 A1    7/2021

OTHER PUBLICATIONS

Q. Song, F. Xu and Y. -Q. Jin, "SAR Image Representation Learning With Adversarial Autoencoder Networks," IGARSS 2019—2019 IEEE International Geoscience and Remote Sensing Symposium, 2019, pp. 9498-9501, doi: 10.1109/IGARSS.2019.8898922. (Year: 2019).*

(Continued)

*Primary Examiner* — Vladimir Magloire
*Assistant Examiner* — Alexander L. Syrkin
(74) *Attorney, Agent, or Firm* — Schwegman Lundberg & Woessner, P.A.

(57) ABSTRACT

A computing machine receives a real synthetic aperture radar (SAR) image including one or more targets. The real SAR image is one of a plurality of real SAR images in a training set. The computing machine generates, for the real SAR image, a model-based target shadow background (TSB) image using a three-dimensional (3D) model of the target. The computing machine generates, for the real SAR image and using an auto-encoder engine, an auto-encoder-generated TSB image using an artificial neural network (ANN). The computing machine computes, using a discriminator engine, an image difference between the auto-encoder-generated TSB image and the model-based TSB image. The computing machine adjusts weights in the auto-encoder engine based on the computed image difference.

20 Claims, 9 Drawing Sheets

(56) References Cited

U.S. PATENT DOCUMENTS

2020/0167605 A1* 5/2020 Kim ............... G06N 20/00
2021/0003697 A1* 1/2021 Zhai ............... G01S 13/9021

OTHER PUBLICATIONS

D. Malmgren-Hansen, A. Kusk, J. Dall, A. A. Nielsen, R. Engholm and H. Skriver, "Improving SAR Automatic Target Recognition Models With Transfer Learning From Simulated Data," in IEEE Geoscience and Remote Sensing Letters, vol. 14, No. 9, pp. 1484-1488, Sep. 2017, doi: 10.1109/LGRS.2017.2717486. (Year: 2017).*

Raphael Couturier, Gilles Perrot, Michel Salomon "Image Denoising Using a Deep Encoder-Decoder Network with Skip Connections" in "Neural Information Processing", 2018, vol. 11306 Springer ISBN: 978-3-030-04223-3 (Year: 2018).*

S. Papson and R. Narayanan, "Modeling of Target Shadows for SAR Image Classification," 35th IEEE Applied Imagery and Pattern Recognition Workshop (AIPR'06), 2006, pp. 3-3, doi: 10.1109/AIPR.2006.27. (Year: 2006).*

"International Application Serial No. PCT/US2020/060223, International Search Report dated Mar. 19, 2021", 3 pgs.

"International Application Serial No. PCT/US2020/060223, Written Opinion dated Mar. 19, 2021", 9 pgs.

Couturier, et al., "Image Denoising Using a Deep Encoder-Decoder Network with Skip Connections", ICONIP, (Nov. 18, 2018), 554-565.

Malmgren-Hansen, David, "improving SAR Automatic Target Recognition Models with Transfer Learning from Simulated Data", IEEE Geoscience and Remote Sensing Letters vol. 14, No. 9, (Sep. 1, 2017), 1484-1488.

Rohit, Girdhar, et al., "Learning a Predictable and Generative Vector Representation for Objects", Arxiv.Org, Cornell University Library, 201 Olin Library Cornell University Ithaca, NY 14853, (Mar. 29, 2016), XP080692493, (Mar. 29, 2016), 16 pgs.

Song, Qian, et al., "SAR Image Representation Learning with Adversarial Autoencoder Networks", Igarss IEEE International Geoscience and Remote Sensing Symposium, IEEE, (Jul. 28, 2019), 9498-9501.

Yunpeng, Chang, et al., "Generating SAR Images Based on Neural Network", IEEE International Conference on Computational Electromagnetics (ICCEM), IEEE, (Mar. 20, 2019), 1-3.

Isola, Phillip, et al., "Image-to-Image Translation with Conditional Adversarial Networks", arXiv: 1611.07004 [cs.CV], (Nov. 22, 2017), 17 pgs.

Souly, Nasim, et al., "Semi Supervised Semantic Segmentation Using Generative Adversarial Network", The IEEE international Conference on Computer Vision (ICCV), (2017), 5688-5696.

Zhu, Jun-Yan, "Unpaired Image-to-lmage Translation using Cycle-Consistent Adversarial Networks", arXiv:1703.10593 [cs.CV], 18 pgs.

* cited by examiner

GENERATIVE ADVERSARIAL NETWORK-BASED TARGET IDENTIFICATION

TECHNICAL FIELD

Embodiments pertain to computer architecture. Some embodiments relate to generative adversarial networks (GANs). Some embodiments relate to GAN-based target identification in synthetic aperture radar (SAR) images.

BACKGROUND

Identifying targets in synthetic aperture radar (SAR) images may be challenging. Techniques for more efficient identification of targets in SAR images may be desirable.

SUMMARY

Figure 1:
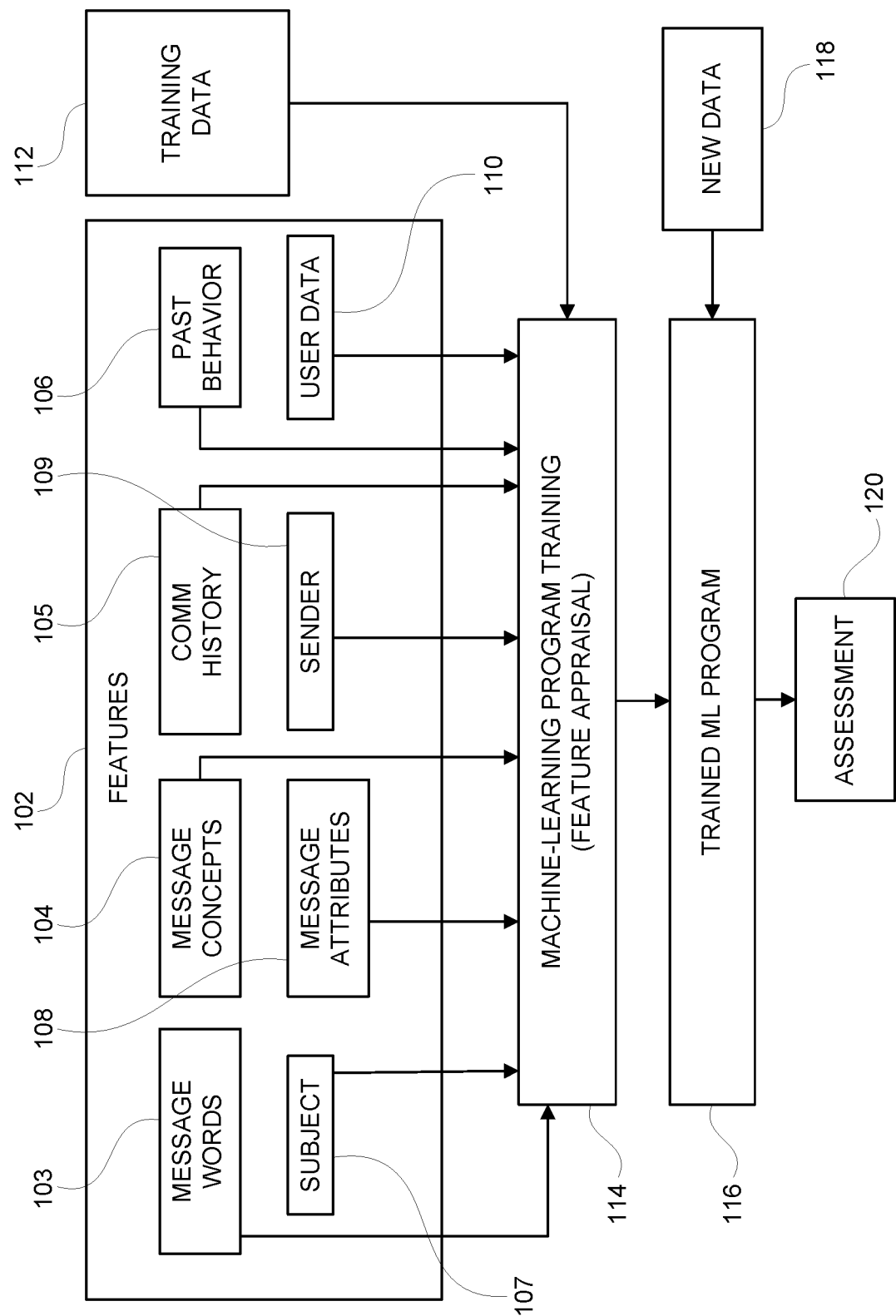
FIG. 1 illustrates the training and use of a machine-learning program, in accordance with some embodiments.

The present disclosure generally relates to machines configured for generative adversarial network-based target identification.

According to some aspects of the technology described herein, a method includes receiving a real synthetic aperture radar (SAR) image including one or more targets, the real SAR image being one of a plurality of real SAR images in a training set. The method includes generating, for the SAR image, a model-based target shadow background (TSB) image using a three-dimensional (3D) model of the target. The method includes generating, for the SAR image and using an auto-encoder engine, an auto-encoder-generated TSB image using an ANN. The method includes computing, using a discriminator engine, an image difference between the auto-encoder-generated TSB image and the model-based TSB image. The method includes adjusting weights in the auto-encoder engine based on the computed image difference.

Other aspects include an apparatus including processing circuitry and memory, the processing circuitry to perform the above method, and a machine-readable medium storing instructions for one or more machines to perform the above method.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, identifying targets in synthetic aperture radar (SAR) images may be challenging. In some cases, an artificial neural network (ANN) may be trained to identify targets in SAR images. However, the ANN may rely on background features, rather than features of the target, to identify the target. For example, if the target is a ship in an ocean, the ANN may identify the position of a ship based on the shape, color or texture of the ocean near the ship, rather than based on the shape, color or texture of the ship itself. As the foregoing illustrates, new techniques for identification of targets in SAR images may be desirable.

Some aspects of the technology disclosed herein are directed to new techniques for training and inference in for identification of targets in SAR images. In some embodiments, a computing machine receives a real synthetic aperture radar (SAR) image including one or more targets. The real SAR image is one of a plurality of real SAR images in a training set. The computing machine generates, for the SAR image, a model-based target shadow background (TSB) image using a three-dimensional (3D) model of the target. The computing machine generates, for the SAR image and using an auto-encoder engine, an auto-encoder-generated TSB image using an ANN. The computing machine computes, using a discriminator engine, an image difference between the auto-encoder-generated TSB image and the model-based TSB image. The computing machine adjusts weights in the auto-encoder engine based on the computed image difference.

As used herein, the term "computing machine" may include a single computing machine or multiple computing machines. A computing machine may include any device or combination of devices that includes processing circuitry and memory. The processing circuitry and the memory may reside in the same device or in different devices.

Throughout this document, some method(s) (e.g., in FIG. 6) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, the machine-learning program 116 may be asked to count the number of sedans and pickup trucks in a parking lot between 10:00 and 11:00. The machine-learning program 116 determines the required image quality to extract the information that is needed. The machine-learning program 116 determines if a target model exists for sedans and pickup trucks. The machine-learning program 116 locates images having the required image quality to extract the information that is needed. If such images do not exist for the given time and geographic location parameters, the machine-learning program 116 requests collection of such images for the given time and geographic location parameters. Upon receiving the requested or located images, the machine-learning program 116 pushes the images to the appropriate model.

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
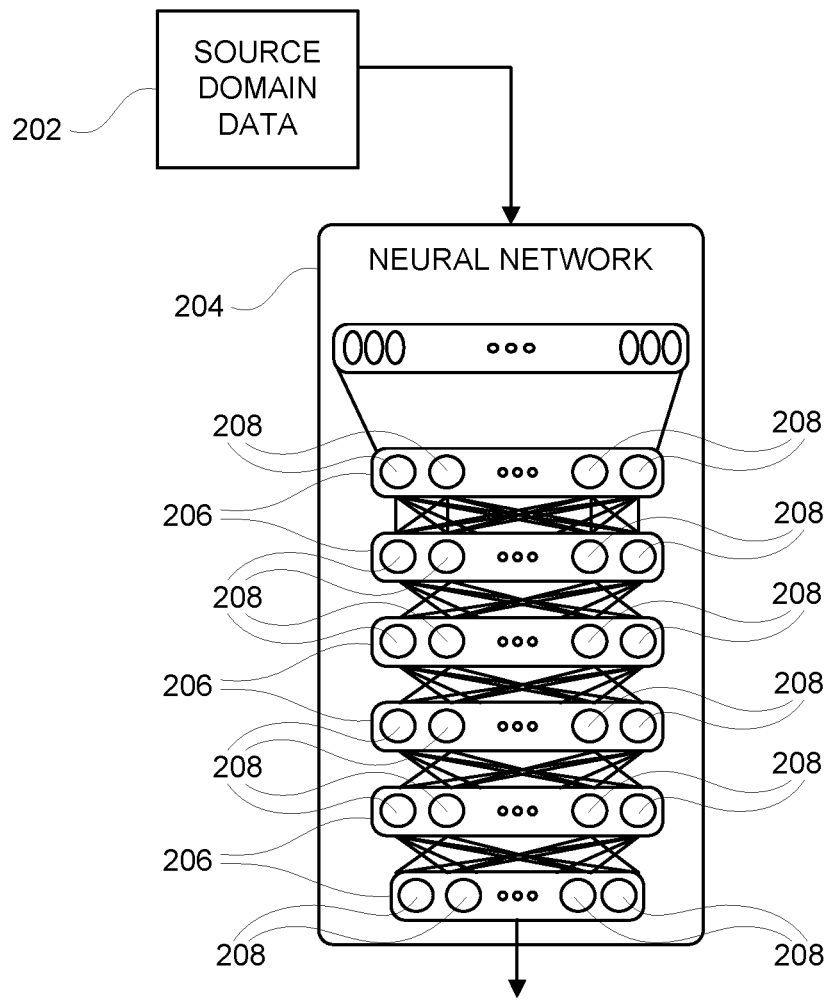
FIG. 2 illustrates an example neural network, in accordance with some embodiments.
Figure 2:
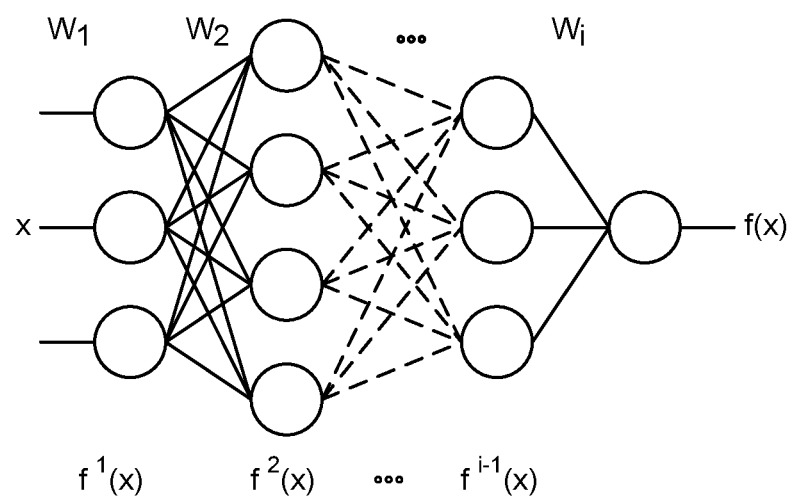

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output $f(x)$ is computed.

In some example embodiments, the neural network 204 (e.g., deep learning, deep convolutional, or recurrent neural network) comprises a series of neurons 208. A neuron 208 is an architectural element used in data processing and artificial intelligence, particularly machine learning on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized in various configurations of neural networks to provide interactions and relationship learning modeling for how each of the frames in an utterance are related to one another.

For example, a neural network node serving as a neuron includes several gates to handle input vectors (e.g., sections of an image), a memory cell, and an output vector (e.g., contextual representation). The input gate and output gate control the information flowing into and out of the memory cell, respectively. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., patterns in an image). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
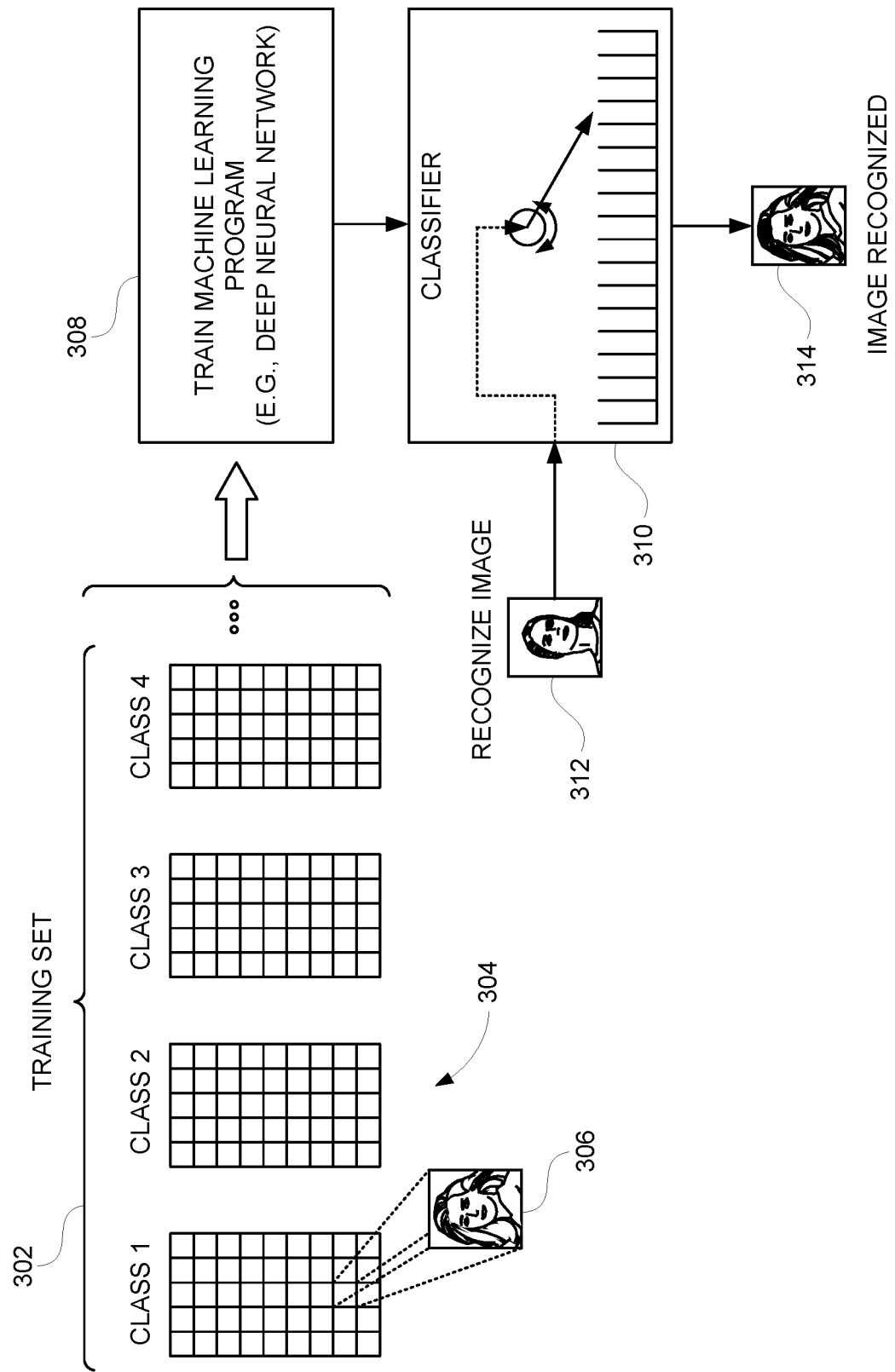
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
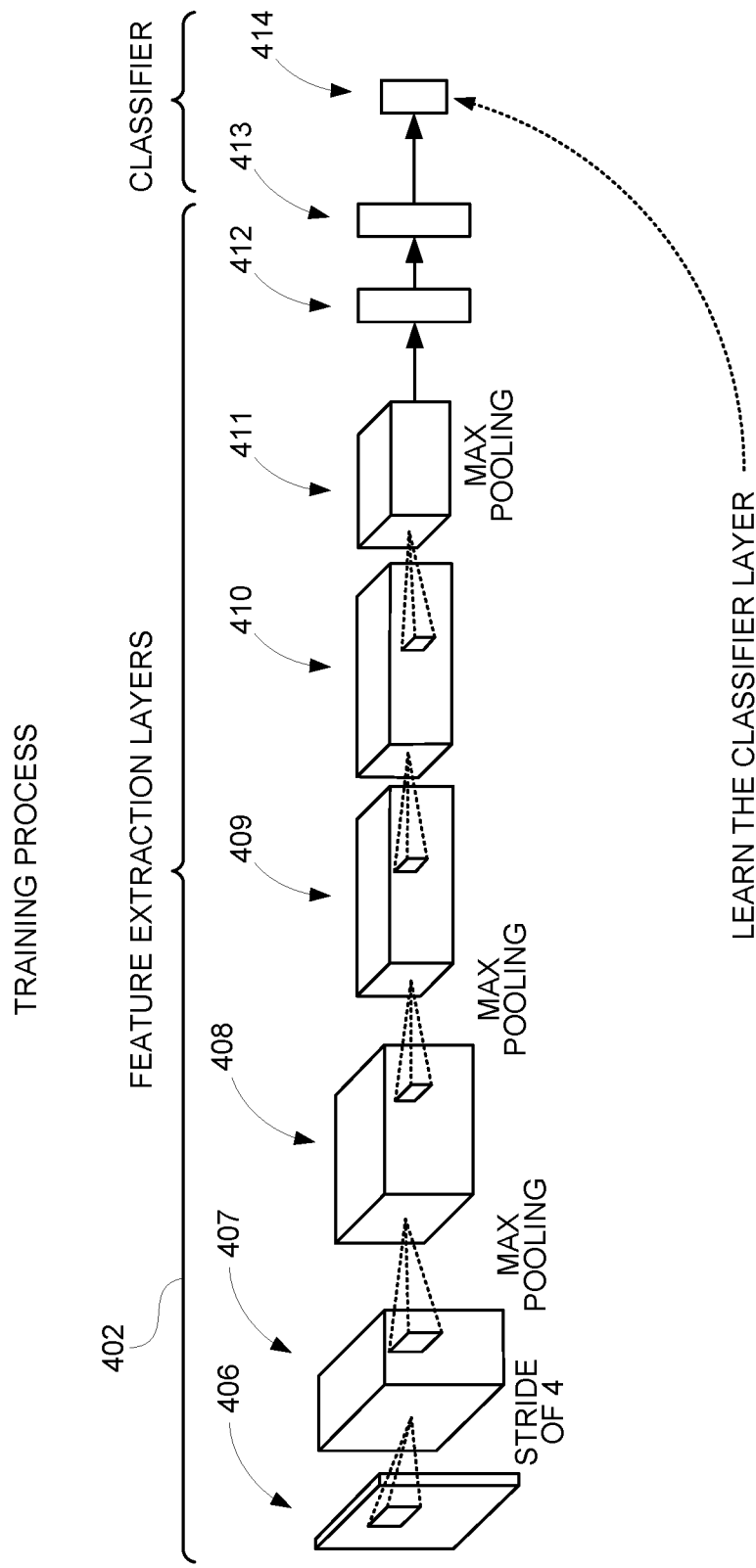
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks (also known as "deep convolutional networks" or "DCNs"), the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

FIG. 4 is described in conjunction with a "stride of 4." However, it should be noted that any other positive integer stride value may be used. Also, FIG. 4 describes some but not all examples of stages of neural network processing. Some aspects of the technology disclosed herein may implement one or more of: convolution, skip connections, activation, batch normalization, dropout, and the predictive function. Skip connections include shortcuts to jump over some layers (e.g., layer m provides input directly to layer m+2). An activation is a minimum amount of input that causes an artificial neuron to "fire" an output. Batch normalization is a technique for training very deep neural networks that standardizes the inputs to a layer for each mini-batch. This has the effect of stabilizing the learning process and dramatically reducing the number of training epochs required to train deep networks. Dropout sets the output of some neurons to zero in order to prevent a neural network from overfitting. The idea of dropout is to randomly drop units (along with their connections) from the artificial neural network during training. This prevents the units from co-adapting too much.

Figure 5:
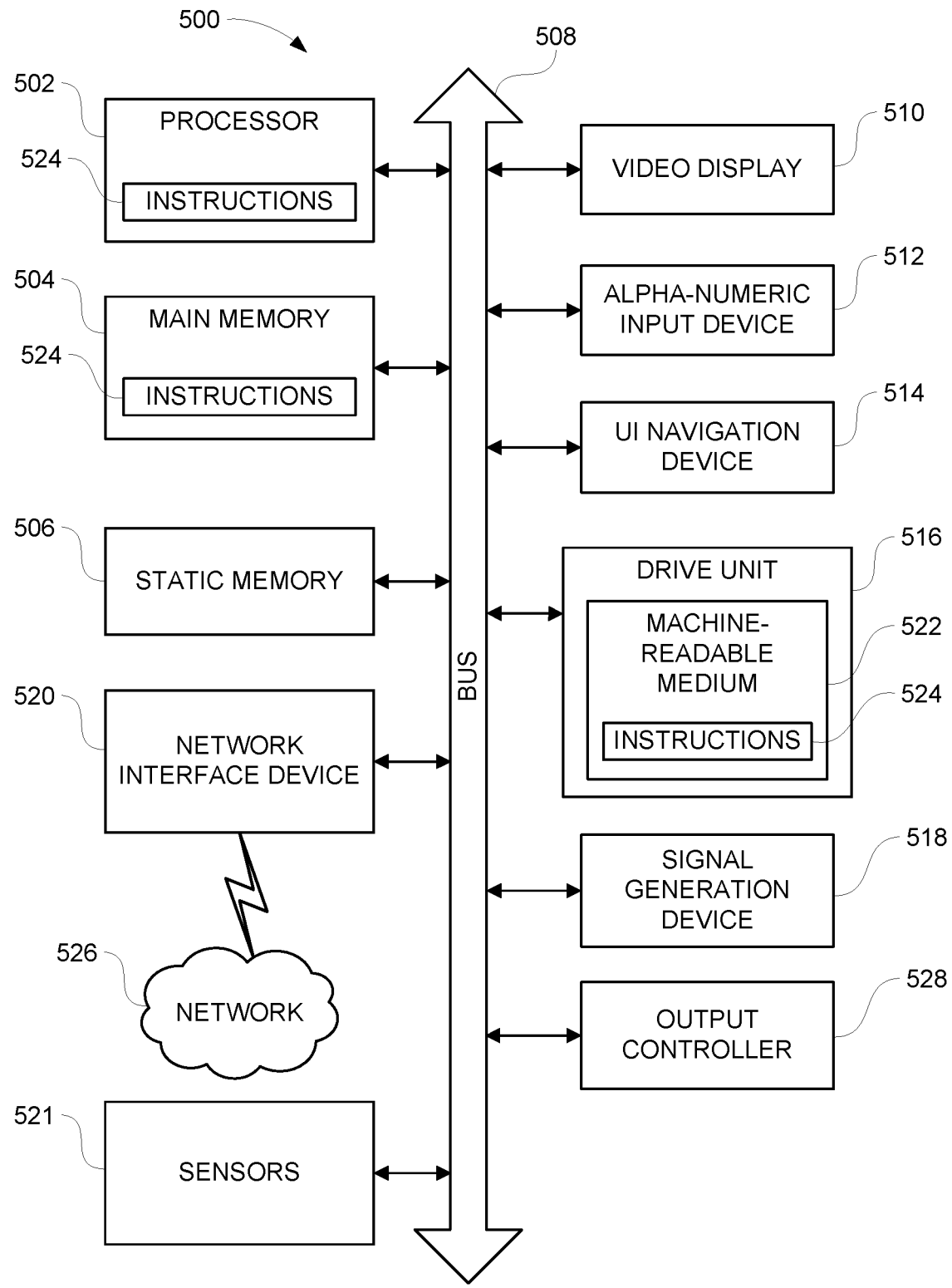
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

The technology disclosed herein uses various engines, each of which is constructed, programmed, configured, or otherwise adapted, to carry out a function or set of functions. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

Figure 6:
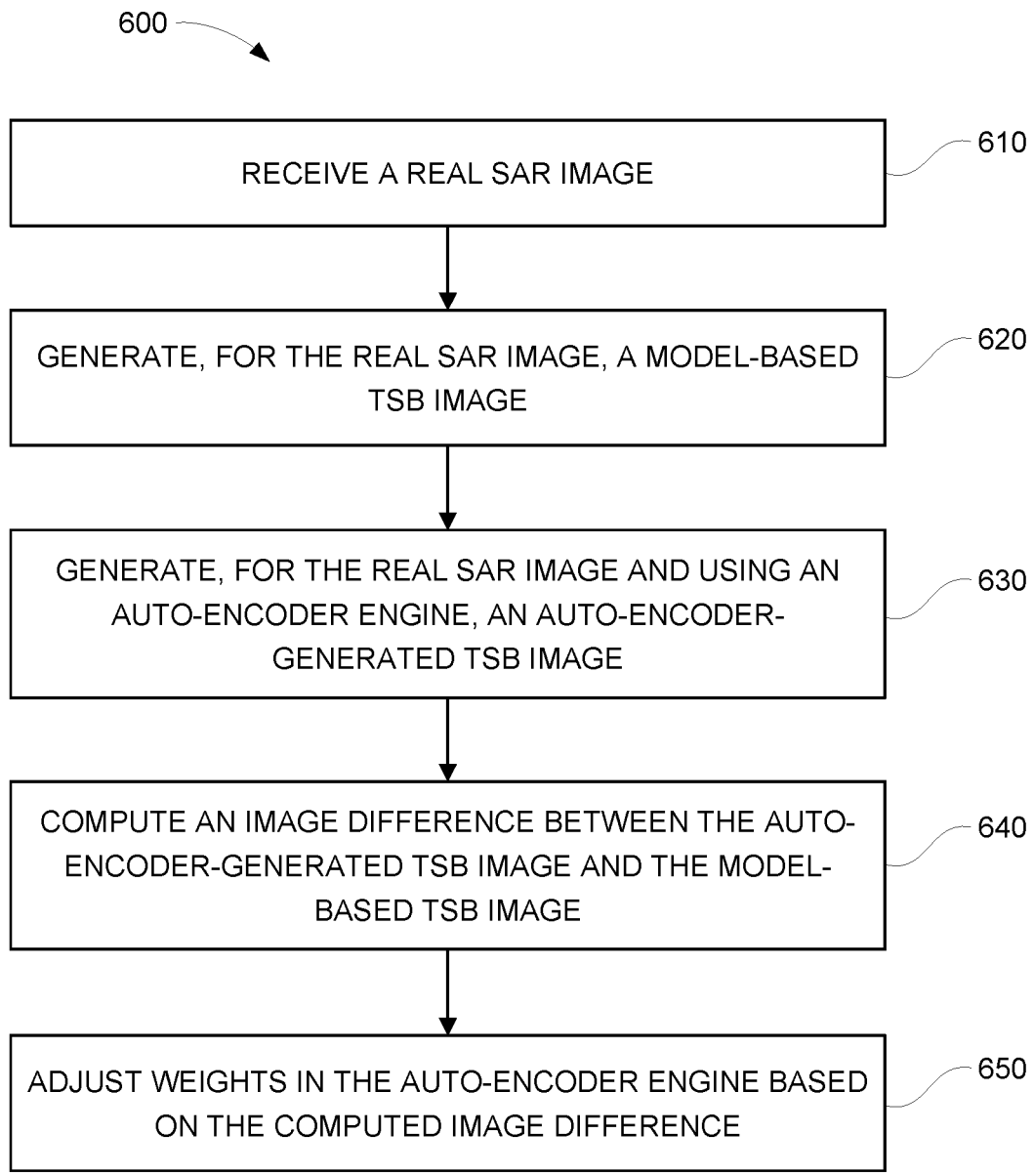
FIG. 6 is a flow chart of a method for training an auto-encoder engine for target identification using a generative adversarial network (GAN), in accordance with some embodiments.

FIG. 6 is a flow chart of a method 600 for training an auto-encoder engine for target identification using a generative adversarial network (GAN), in accordance with some embodiments.

At operation 610, a computing machine receives a real synthetic aperture radar (SAR) image including one or more targets. The real SAR image is one of a plurality of real SAR images in a training set.

At operation 620, the computing machine generates, for the real SAR image, a model-based target shadow background (TSB) image using a three-dimensional (3D) model of the target. Each TSB image identifies each pixel as being associated with the target, a shadow or a background. The model-based TSB image may be generated using a 3D model of the target, for example, a voxel model or a model that takes into account azimuth (Az) and/or elevation (El). The 3D model may be generated based on metadata of the SAR image.

At operation 630, the computing machine generates, for the real SAR image and using an auto-encoder engine, an auto-encoder-generated TSB image using an artificial neural network (ANN). The auto-encoder engine may include the ANN. The ANN may be a deep convolutional network (DCN).

At operation 640, the computing machine computes, using a discriminator engine, an image difference between the auto-encoder-generated TSB image and the model-based TSB image. In some embodiments, a GAN comprises the auto-encoder engine and the discriminator engine.

At operation 650, the computing machine adjusts weights in the auto-encoder engine based on the computed image difference.

In some cases, the computing machine determines that the auto-encoder-generated TSB image and the model-based TSB image are not differentiable. The computing machine determines that the auto-encoder engine is fully trained based on the auto-encoder-generated TSB image and the model-based TSB image not being differentiable for at least a threshold number of SAR images, including the real SAR image, from the training set.

In some cases, during inference (e.g., after training is completed), the computing machine receives, at the auto-encoder engine, a new SAR image. The computing machine generates, using the auto-encoder engine, a TSB image for the new SAR image. The computing machine identifies, using the generated TSB image for the new SAR image, one or more targets in the new SAR image.

In some embodiments, the auto-encoder engine comprises an encoder sub-engine, a latent vector, and a decoder sub-engine. The encoder sub-engine receives the new SAR image and transmits data to the latent vector and to the decoder sub-engine via a skip connection. The latent vector receives data from the encoder sub-engine and transmits processed data to the decoder sub-engine. The decoder sub-engine outputs the generated TSB image for the new SAR image.

Figure 7:
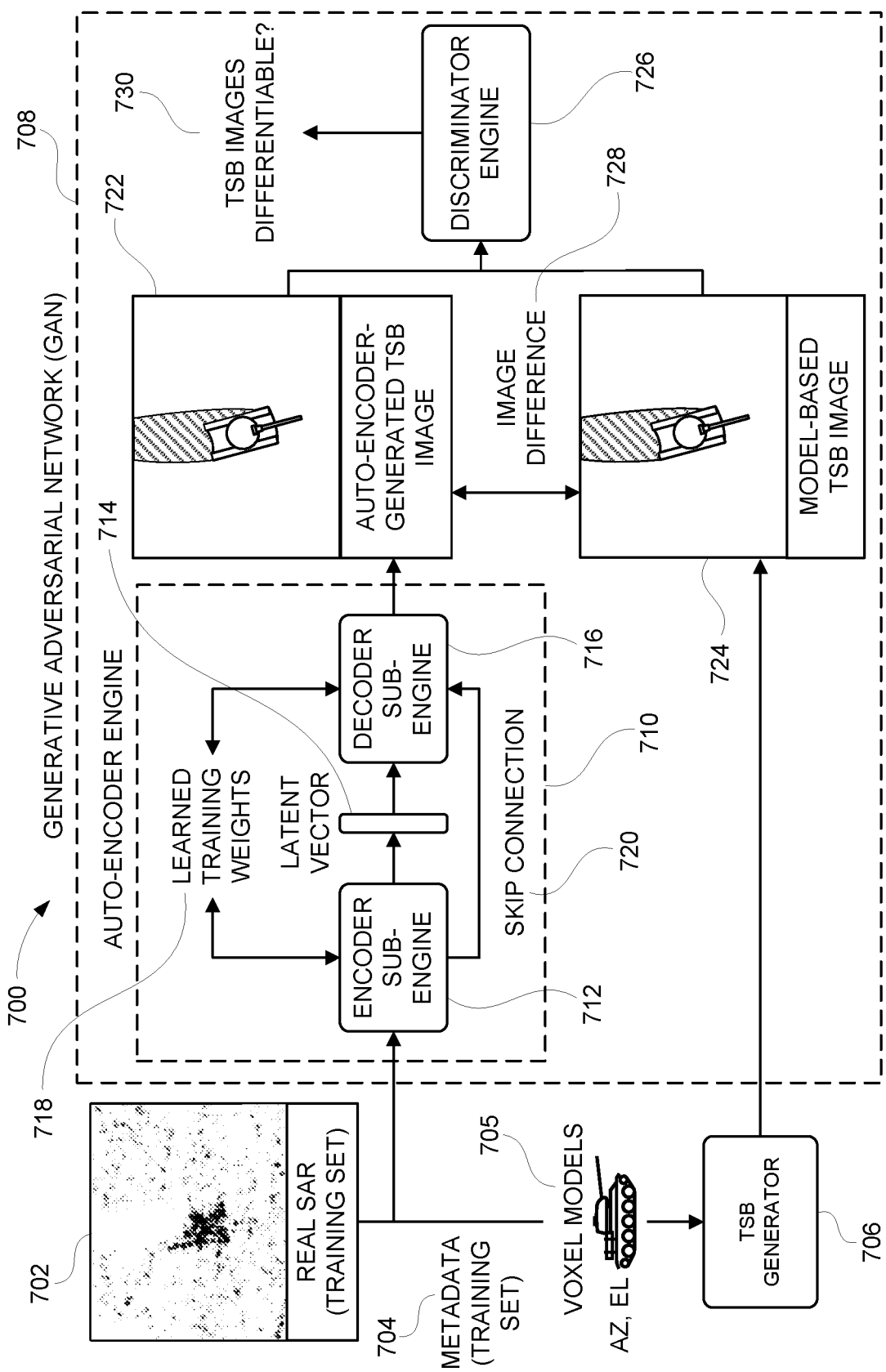
FIG. 7 is a data flow diagram for training an auto-encoder engine for target identification using a generative adversarial network (GAN), in accordance with some embodiments.

FIG. 7 is a data flow diagram 700 for training an auto-encoder engine 710 for target identification using a generative adversarial network (GAN) 708, in accordance with some embodiments.

As shown in FIG. 7, a real SAR image 702 from a training set has metadata 704 extracted from it. The metadata 704 is used for voxel models 705 or other models that take into account azimuth (Az) and/or elevation (El). The voxel models 705 or other models are provided to a TSB generator 706, which generates a model-based TSB image 724, which is processed by the GAN 708.

The metadata 704 of the real SAR image 702 is also provided, for processing within the GAN 708, to an auto-encoder engine 710 that is being trained by the GAN 708. As illustrated, the auto-encoder engine 710 includes an encoder sub-engine 712, a latent vector 714, and a decoder sub-engine 716. The encoder sub-engine 712 receives the real SAR image 702 (and/or the metadata 704) and transmits data to the latent vector 714 and to the decoder sub-engine 716 via a skip connection 720. The latent vector 714 receives data from the encoder sub-engine 712 and transmits processed data to the decoder sub-engine 716. The decoder sub-engine 716 outputs an auto-encoder-generated TSB image 722 for the real SAR image 702. The auto-encoder engine 710 also includes learned training weights 718, which are adjusted by operation of the GAN 708.

During operation of the GAN 708, the auto-encoder-generated TSB image 722 and the model-based TSB image 724 are provided to the discriminator engine 726. The discriminator engine 726 determines whether the TSB images 722 and 724 are differentiable 730, as well as an image difference 728 between the TSB images 722 and 724. The learned training weights 718 of the auto-encoder engine 710 are adjusted, by the GAN 708, based on the image difference 728. During training, upon determining that a certain number of TSB images 722 and 724, based on real SAR image(s) 702 from the training set are not differentiable 730, the GAN 708 determines that training of the autoencoder engine 710 is complete and provides the auto-encoder engine 710 for inference, as shown in FIG. 8.

In some cases, the TSB generator 706 generates the model-based TSB image 724 from the real SAR image 702 using a simplified ray-tracing technique (no-bounce) to estimate which pixels of the TSB image will be the target, shadow, and background. The metadata 704 and the voxel models 705 may be user supplied. The TSB generator 706 uses the voxel model 705 (which may be 3D) along with the azimuth and elevation as inputs to generate the model-based TSB image 724. The auto-encoder engine 710 relies on the real SAR image 702 itself (and not the voxel model 705 and azimuth and elevation data) to compute the auto-encoder-generated TSB image 722.

Figure 8:
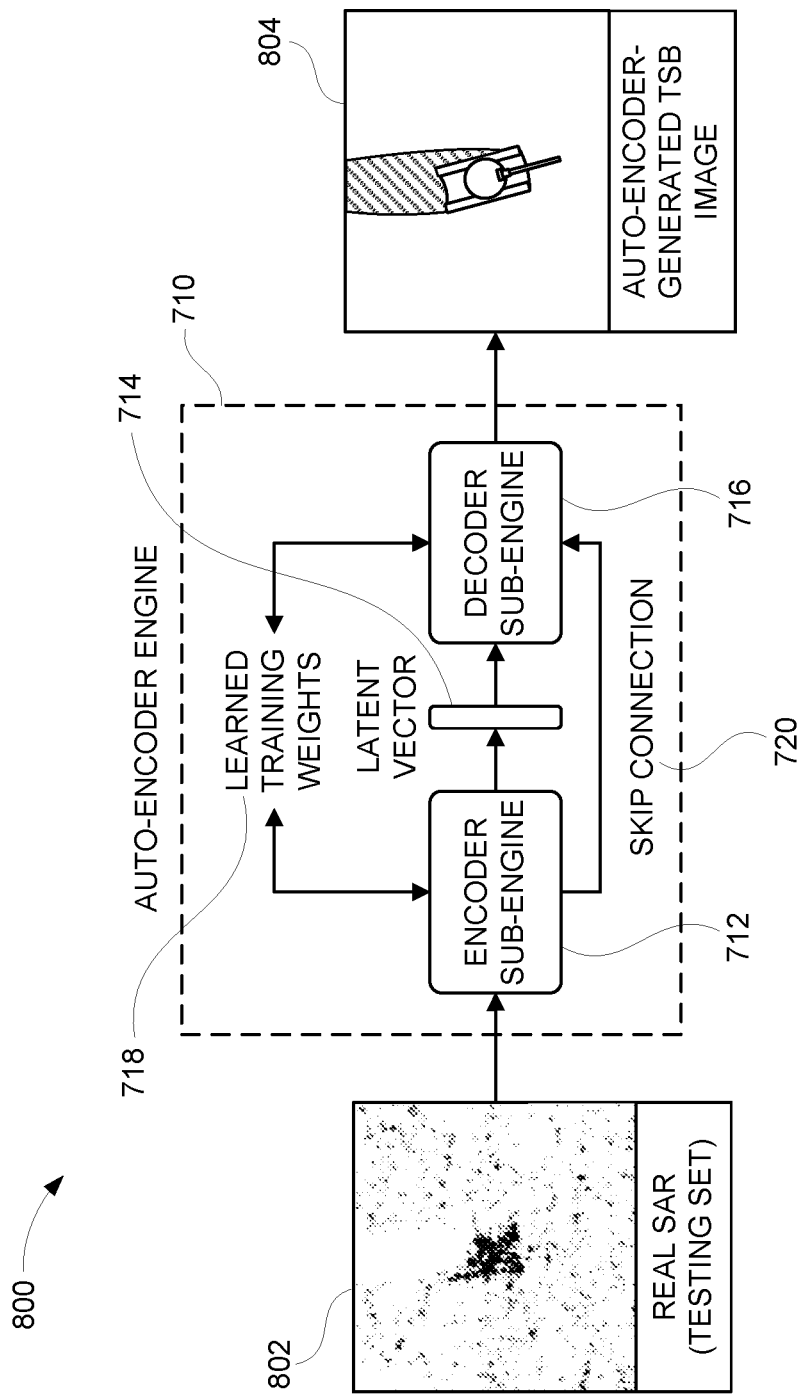
FIG. 8 is a data flow diagram for generating a target shadow background (TSB) image using the trained auto-encoder engine, in accordance with some embodiments.

FIG. 8 is a data flow diagram 800 for generating (during inference) a target shadow background (TSB) image using the trained auto-encoder engine, in accordance with some embodiments.

As shown in FIG. 8, a real SAR image 802 from the testing set is provided to the auto-encoder engine 710, and the auto-encoder engine 710 generates an auto-encoder generated TSB image 804.

As illustrated, the auto-encoder engine 710 includes the encoder sub-engine 712, the latent vector 714, and the decoder sub-engine 716. The encoder sub-engine 712 receives the real SAR image 802 and transmits data to the latent vector 714 and to the decoder sub-engine 716 via the skip connection 720. The latent vector 714 receives data from the encoder sub-engine 712 and transmits processed data to the decoder sub-engine 716. The decoder sub-engine 716 outputs the auto-encoder-generated TSB image 804 for the real SAR image 802. The auto-encoder engine 710 also includes learned training weights 718, which were previously generated, for example, using the techniques described in FIGS. 6-7.

Figure 9:
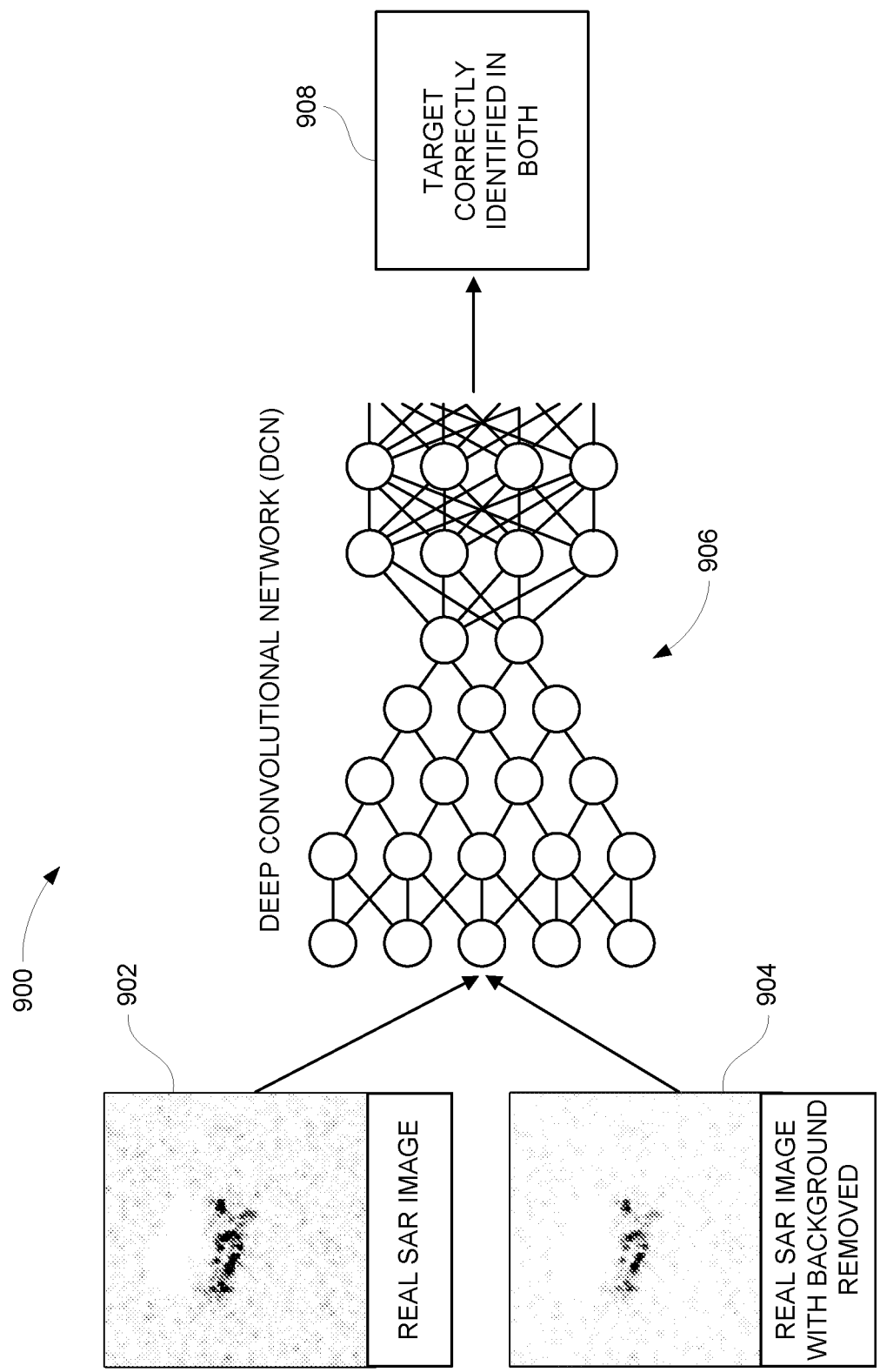
FIG. 9 is a data flow diagram for target identification using a deep convolutional network (DCN), in accordance with some embodiments.

FIG. 9 is a data flow diagram 900 for target identification using a deep convolutional network (DCN) 906, in accordance with some embodiments. The DCN 906 may be a convolutional neural network (CNN) that is "deep," i.e., includes at least one hidden layer in addition to the input layer and the output layer. The DCN 906 may be included in the auto-encoder engine 710.

As shown in FIG. 9, the DCN 960 receives, as input, a real SAR image 902 and a real SAR image with background removed 904. The image 904 may include the same target(s) and shadow(s) as the image 902. However, the background may be removed and replaced with blank white (or another color) space. For example, if the image 902 is a sea-based image and the targets are ships, the image 904 may have the sea water replaced with white space. As illustrated, each image 902 and 904 is provided to the DCN 906. At block 908, the DCN 906 should correctly identify the target(s) in both of the images 902 and 904, if the DCN 906 has been trained properly.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A generative adversarial network (GAN) training apparatus comprising:
   processing circuitry; and
   a memory storing instructions which, when executed by the processing circuitry, cause the processing circuitry to perform operations comprising:
   receiving a real synthetic aperture radar (SAR) image including a target, the real SAR image being one of a plurality of real SAR images in a training set;
   generating, for the real SAR image, a model-based target shadow background (TSB) image using a three-dimensional (3D) model of the target;
   generating, using the real SAR image as input to a neural network (NN) auto-encoder, an auto-encoder-generated TSB image;
   computing, using a discriminator engine, an image difference between the auto-encoder-generated TSB image and the model-based TSB image; and adjusting weights in the auto-encoder based on the computed image difference.

2. The apparatus of claim 1, wherein each TSB image includes respective pixels identifying each pixel as being associated with the target, a shadow or a background.

3. The apparatus of claim 1, the operations further comprising:
   determining that the auto-encoder-generated TSB image and the model-based TSB image are not differentiable; and
   determining that the auto-encoder is fully trained based on the auto-encoder-generated TSB image and the model-based TSB image not being differentiable for at least a threshold number of SAR images, including the real SAR image, from the training set.

4. The apparatus of claim 1, the operations further comprising:
   receiving, at the auto-encoder, a new SAR image;
   generating, using the auto-encoder, a new TSB image for the new SAR image; and
   identifying, using the new TSB image, one or more targets in the new SAR image.

5. The apparatus of claim 4, wherein:
   the auto-encoder comprises an encoder sub-engine, a latent vector, and a decoder sub-engine;
   the encoder sub-engine receives the new SAR image and transmits data to the latent vector and to the decoder sub-engine via a skip connection;
   the latent vector receives data from the encoder sub-engine and transmits processed data to the decoder sub-engine; and
   the decoder sub-engine outputs the generated TSB image for the new SAR image.

6. The apparatus of claim 1, wherein the 3D model comprises a voxel model.

7. The apparatus of claim 1, wherein a GAN comprises the auto-encoder and the discriminator engine.

8. A non-transitory machine-readable medium storing instructions which, when executed by processing circuitry of one or more machines, cause the processing circuitry to perform operations comprising:
   receiving a real synthetic aperture radar (SAR) image including a target, the real SAR image being one of a plurality of real SAR images in a training set;
   generating, for the real SAR image, a model-based target shadow background (TSB) image using a three-dimensional (31)) model of the target;
   generating, using the real SAR image as input to a neural network (NN) auto-encoder, an auto-encoder-generated TSB image;
   computing, using a discriminator engine, an image difference between the auto-encoder-generated TSB image and the model-based TSB image; and
   adjusting weights in the auto-encoder based on the computed image difference.

9. The machine-readable medium of claim 8, wherein each TSB image includes respective pixels identifying each pixel as being associated with the target, a shadow or a background.

10. The machine-readable medium of claim 8, the operations further comprising:
    determining that the auto-encoder-generated TSB image and the model-based TSB image are not differentiable; and
    determining that the auto-encoder is fully trained based on the auto-encoder-generated TSB image and the model-based TSB image not being differentiable for at least a threshold number of SAR images, including the real SAR image, from the training set.

11. The machine-readable medium of claim 8, the operations further comprising:
    receiving, at the auto-encoder, a new SAR image;
    generating, using the auto-encoder, a new TSB image for the new SAR image; and
    identifying, using the new TSB image, one or more targets in the new SAR image.

12. The machine-readable medium of claim 11, wherein:
    the auto-encoder engine comprises an encoder sub-engine, a latent vector, and a decoder sub-engine;
    the encoder sub-engine receives the new SAR image and transmits data to the latent vector and to the decoder sub-engine via a skip connection;
    the latent vector receives data from the encoder sub-engine and transmits processed data to the decoder sub-engine; and
    the decoder sub-engine outputs the generated TSB image for the new SAR image.

13. The machine-readable medium of claim 8, wherein the 3D model comprises a voxel model.

14. The machine-readable medium of claim 8, wherein a generative adversarial network (GAN) comprises the auto-encoder and the discriminator engine.

15. A method, implemented at one or more computing machines, the method comprising:
    receiving a real synthetic aperture radar (SAR) image including a target, the real SAR image being one of a plurality of real SAR images in a training set;
    generating, for the real SAR image, a model-based target shadow background (TSB) image using a three-dimensional (3D) model of the target;
    generating, using the real SAR image and a neural network (NN) auto-encoder, an auto-encoder-generated TSB image;
    computing, using a discriminator engine, an image difference between the auto-encoder-generated TSB image and the model-based TSB image; and
    adjusting weights in the auto-encoder based on the computed image difference.

16. The method of claim 15, wherein each TSB image includes pixels identifying each pixel as being associated with the target, a shadow or a background.

17. The method of claim 15, further comprising:
    determining that the auto-encoder-generated TSB image and the model-based TSB image are not differentiable; and
    determining that the auto-encoder is fully trained based on the auto-encoder-generated TSB image and the model-based TSB image not being differentiable for at least a threshold number of SAR images, including the real SAR image, from the training set.

18. The method of claim 15, further comprising:
    receiving, at the auto-encoder, a new SAR image;
    generating, using the auto-encoder, a new TSB image for the new SAR image; and
    identifying, using the new TSB image, one or more targets in the new SAR image.

19. The method of claim 18, wherein:
    the auto-encoder comprises an encoder sub-engine, a latent vector, and a decoder sub-engine;
    the encoder sub-engine receives the new SAR image and transmits data to the latent vector and to the decoder sub-engine via a skip connection;

the latent vector receives data from the encoder sub-engine and transmits processed data to the decoder sub-engine; and the decoder sub-engine outputs the generated TSB image for the new SAR image.

20. The method of claim 15, wherein the 3D model comprises a voxel model.

\* \* \* \* \*